United States Patent
Bae et al.

(10) Patent No.: US 12,188,435 B2
(45) Date of Patent: Jan. 7, 2025

(54) DUAL-MODE RAMJET ENGINE WITH VARIABLE FUEL INJECTION

(71) Applicant: AGENCY FOR DEFENSE DEVELOPMENT, Daejeon (KR)

(72) Inventors: Juhyun Bae, Daejeon (KR); Sangwook Jin, Daejeon (KR); Haeseung Jeong, Daejeon (KR); Minchan Kwon, Daejeon (KR); Seokjin Oh, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 18/609,726

(22) Filed: Mar. 19, 2024

(65) Prior Publication Data
US 2024/0318615 A1    Sep. 26, 2024

(30) Foreign Application Priority Data

Mar. 20, 2023  (KR) .................. 10-2023-0035968

(51) Int. Cl.
| | |
|---|---|
| *F02K 7/10* | (2006.01) |
| *F23R 3/22* | (2006.01) |
| *F23R 3/28* | (2006.01) |

(52) U.S. Cl.
CPC .............. *F02K 7/10* (2013.01); *F23R 3/22* (2013.01); *F23R 3/286* (2013.01); *F23R 3/283* (2013.01)

(58) Field of Classification Search
CPC ...... F02K 7/10; F02K 7/14; F23R 3/22; F23R 3/283; F23R 3/286
See application file for complete search history.

(56) References Cited

U.S. PATENT DOCUMENTS

| | | | | |
|---|---|---|---|---|
| 4,150,539 A | * | 4/1979 | Rubins | F23R 3/22 |
| | | | | 60/39.23 |
| 9,745,921 B2 | | 8/2017 | Trefny et al. | |
| 10,125,993 B2 | * | 11/2018 | Beck | F23R 3/36 |
| 2017/0108224 A1 | * | 4/2017 | Beck | F23R 3/36 |

FOREIGN PATENT DOCUMENTS

| | | |
|---|---|---|
| JP | 1997317558 A | 12/1997 |
| JP | 2012207610 A | 10/2012 |
| JP | 2015017618 A | 1/2015 |
| KR | 19990060745 A | 7/1999 |
| KR | 101954034 B1 | 3/2019 |

* cited by examiner

*Primary Examiner* — William H Rodriguez
(74) *Attorney, Agent, or Firm* — Maginot, Moore & Beck, LLP

(57) ABSTRACT

Disclosed is a dual-mode ramjet engine including: a combustor through which air flowing in from the front passes; a sliding injector configured to perform a sliding operation from an upper surface of the combustor along a height direction perpendicular to an air flow direction; and a cavity-type flame holder formed behind the sliding injector on the upper surface of the combustor and having a cavity that is concavely recessed, wherein the sliding injector includes: a plurality of fuel injection holes formed on both sides and configured to inject fuel; a fuel injection passage passing through the inside along the height direction to be opened downward, and configured to inject fuel; and a first sliding drive unit configured to drive the sliding injector to perform the sliding operation.

20 Claims, 8 Drawing Sheets

DUAL-MODE RAMJET ENGINE WITH VARIABLE FUEL INJECTION

CROSS-REFERENCE TO RELATED APPLICATIONS

This application claims priority under 35 USC § 119(a) to Korean Patent Application No. 10-2023-0035968 filed on Mar. 20, 2023, in the Korean Intellectual Property Office, the disclosure of which is incorporated by reference herein in its entirety.

BACKGROUND

1. Field

The following description relates to a dual-mode ramjet engine with a variable fuel injection device.

2. Description of Related Art

A typical dual-mode ramjet engine using liquid fuel may inject fuel mainly from a wall inside a combustor to maintain a flame in a cavity-type flame holder, and this flame may trigger a combustion reaction between the fuel and air mixed inside the combustor to generate a thrust force.

In this case, to maintain the flame, i.e., flame stabilization, through the adjustment of an amount of fuel based on the flight speed (level 4 to 6 based on the Mach number of flight) of a flying vehicle equipped with the dual-mode ramjet engine, vaporized fuel and air may need to be mixed in a desirable ratio inside the flame holder. However, for example, when the amount of fuel is extremely small or large, the flame may not be maintained but be extinguished, and the engine may therefore lose the thrust force. That is, a key technology is to maintain a desirable fuel and air mixing ratio in the cavity-type flame holder and at the same time maximize the mixture of fuel and air to maximize a combustion reaction in a space inside the combustor, which is outside the flame holder.

However, such a typical wall fuel injection technology alone may not maintain the flame in the cavity-type flame holder and increase the thrust force, at the same time. Although increasing the amount of fuel injected from the wall may increase a penetration distance of the fuel and increase the mixing ratio in the combustor to increase the thrust force, the amount of fuel flowing into the cavity-type flame holder may be relatively reduced, which may adversely affect flame stabilization. In contrast, when the amount of fuel injected from the wall is relatively small, the penetration distance of the fuel may decrease and the amount of fuel flowing into the cavity-type flame holder may increase to allow the fuel and air mixing ratio for fuel stabilization to be adjusted. However, the decreased penetration distance of the fuel may reduce the mixing ratio in the combustor to weaken the combustion reaction of the combustor and decrease the thrust force accordingly.

There may also be a technology for injecting fuel directly into the cavity-type flame holder. However, when fuel that is not vaporized is injected, an amount of heat equivalent to the latent heat of the fuel due to a phase change of the fuel may be absorbed, which may decrease the temperature of flame stabilization and adversely affect flame stabilization.

The above description is information the inventor(s) acquired in the course of conceiving the present disclosure, or already possessed at the time, and is not necessarily art publicly known before the present application was filed.

SUMMARY

An aspect of the present disclosure is to provide a flying vehicle with a dual-mode ramjet engine including a variable fuel injection device.

According to an embodiment, there is provided a dual-mode ramjet engine including: a combustor through which air flowing in from the front passes; a sliding injector configured to perform a sliding operation from an upper surface of the combustor along a height direction perpendicular to an air flow direction; and a cavity-type flame holder formed behind the sliding injector on the upper surface of the combustor and having a cavity that is concavely recessed.

The sliding injector may include: a plurality of fuel injection holes formed on both sides and configured to inject fuel; a fuel injection passage passing through the inside along the height direction to be opened downward, and configured to inject fuel; and a first sliding drive unit configured to drive the sliding injector to perform the sliding operation.

The plurality of fuel injection holes may be installed to be spaced apart from each other along the height direction.

The dual-mode ramjet engine may further include a controller configured to control the sliding operation of the sliding injector and the injection of fuel. The controller may be configured to adjust a position of fuel injected through the plurality of fuel injection holes through the sliding operation of the sliding injector to adjust a distribution of fuel injected into each of the combustor and the cavity-type flame holder.

The sliding injector may further include a front-end portion formed in a portion facing the flow of air flowing in from the front and protruding to have a wedge shape whose lateral width in a left/right direction decreases toward the front.

The controller may be configured to, by partially developing the sliding injector into the combustor, move at least one fuel injection hole among the plurality of fuel injection holes to have a height adjacent to the upper surface of the combustor, and move a remaining fuel injection hole on a lower side to be exposed to the inside of the combustor.

The controller may be configured to control the sliding injector to slide inward on the upper surface of the combustor to be retracted, and inject fuel through the fuel injection passage such that the fuel is injected from a position on the upper surface of the combustor.

The dual-mode ramjet engine may further include: a sliding mixer configured to perform a sliding operation from the upper surface of the combustor along the height direction, behind the sliding injector, wherein the controller may be configured to: slidably move the sliding mixer such that the sliding mixer overlaps behind the sliding injector based on the air flow direction, and induce a turbulent flow to be formed behind the sliding mixer.

The sliding mixer may include: a dispersion protrusion formed to protrude to have an inclination diverging from the flow direction toward the rear; and a second sliding drive unit configured to drive the sliding mixer to perform the sliding operation.

The dispersion protrusion may be provided as a plurality of dispersion protrusions spaced apart from each other along the height direction, and the plurality of dispersion protrusions may have a shape inclined leftward or rightward as it is developed toward the rear.

The sliding injector may further include a first sliding guider installed on a portion facing the rear and coupled to the sliding mixer to be mutually slidably movable with respect to the sliding mixer at the rear, and the sliding mixer may further include a second sliding guider installed on a portion facing the front and coupled to the first sliding guider of the sliding injector to be mutually slidably movable with respect to the first sliding guider at the front.

According to an embodiment described herein, a variable fuel injection device may adjust a fuel distribution formed inside a combustor and a flame holder according to various flight conditions, thereby optimizing combustion efficiency, combustion stability, or thrust according to the various flight conditions.

According to an embodiment described herein, a ramjet engine including a variable fuel injection device may provide fuel injection and mixing functions according to each operating environment of the engine (e.g., improving combustion in a cavity-type flame holder, improving a fuel distribution, improving fuel mixture, and minimizing an internal drag), and may ultimately maintain flames in the cavity-type flame holder and simultaneously increase a thrust force of the engine.

According to an embodiment described herein, a variable fuel injection device may drive a sliding mixing device (also referred to herein as a sliding mixer) that is slidably developed and/or retracted as needed, thereby improving fuel mixture and increasing fuel efficiency.

According to an embodiment described herein, a variable fuel injection device may adjust a portion of fuel to flow along a wall boundary layer toward a cavity-type flame holder as a fuel injection hole of a sliding injector is disposed near an upper surface of a combustor, and may thus improve ignition and combustion stability.

Other features and aspects will be apparent from the following detailed description, the drawings, and the claims.

BRIEF DESCRIPTION OF THE DRAWINGS

The above and other features of certain embodiments of the present disclosure will be more apparent from the following detailed description, taken in conjunction with the accompanying drawings, in which.

DETAILED DESCRIPTION

Hereinafter, embodiments will be described in detail with reference to the accompanying drawings. The following description is about one of the various aspects of the embodiments and forms part of a detailed description of the embodiments.

However, when describing the embodiments with reference to the accompanying drawings, detailed descriptions of well-known functions or configurations will be omitted for the clarity of the gist of the present disclosure.

In addition, unless otherwise defined, all terms used herein including technical or scientific terms have the same meanings as those generally understood consistent with and after an understanding of the present disclosure. Terms, such as those defined in commonly used dictionaries, should be construed to have meanings matching with contextual meanings in the relevant art and the present disclosure, and are not to be construed as an ideal or excessively formal meaning unless otherwise defined herein. Based on this, the terms that match the technical ideas of a dual-mode ramjet engine including a variable fuel injection device according to embodiments of the present disclosure are used herein.

The embodiments described herein and the configurations or structures shown in the accompanying drawings are provided only as some of the more desirable embodiments of a dual-mode ramjet engine including a variable fuel injection device but do not represent all of the technical ideas of the dual-mode ramjet engine including the variable fuel injection device, and it should therefore be understood that there may also be various equivalents and modifications that replace them at the time of filing the present application.

Figure 1:
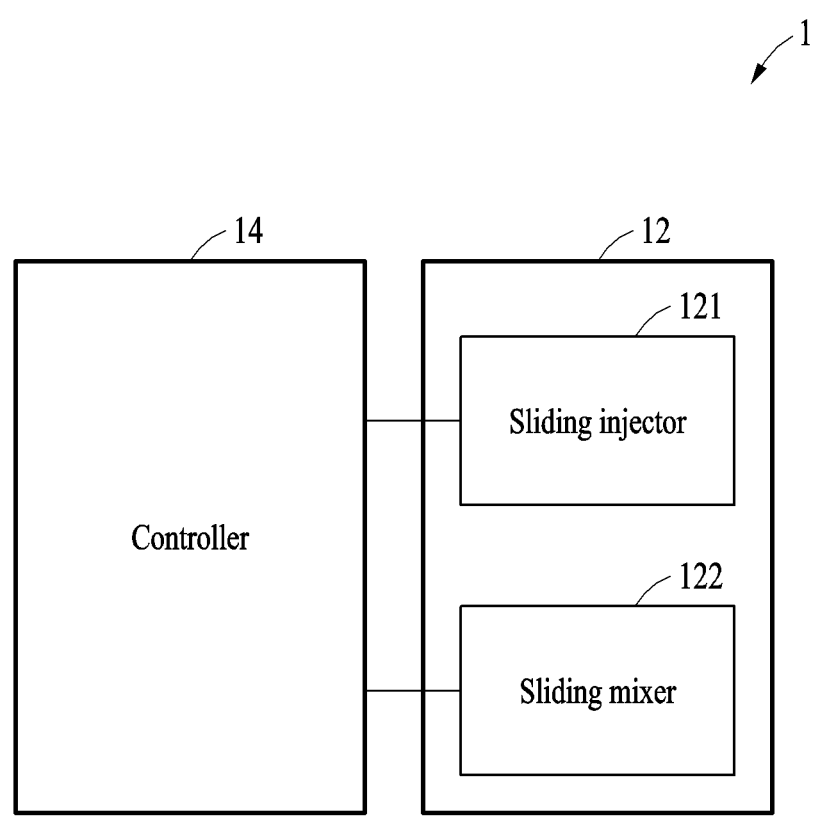
FIG. 1 is a block diagram illustrating a dual-mode ramjet engine including a variable fuel injection device according to an embodiment.
Figure 2:
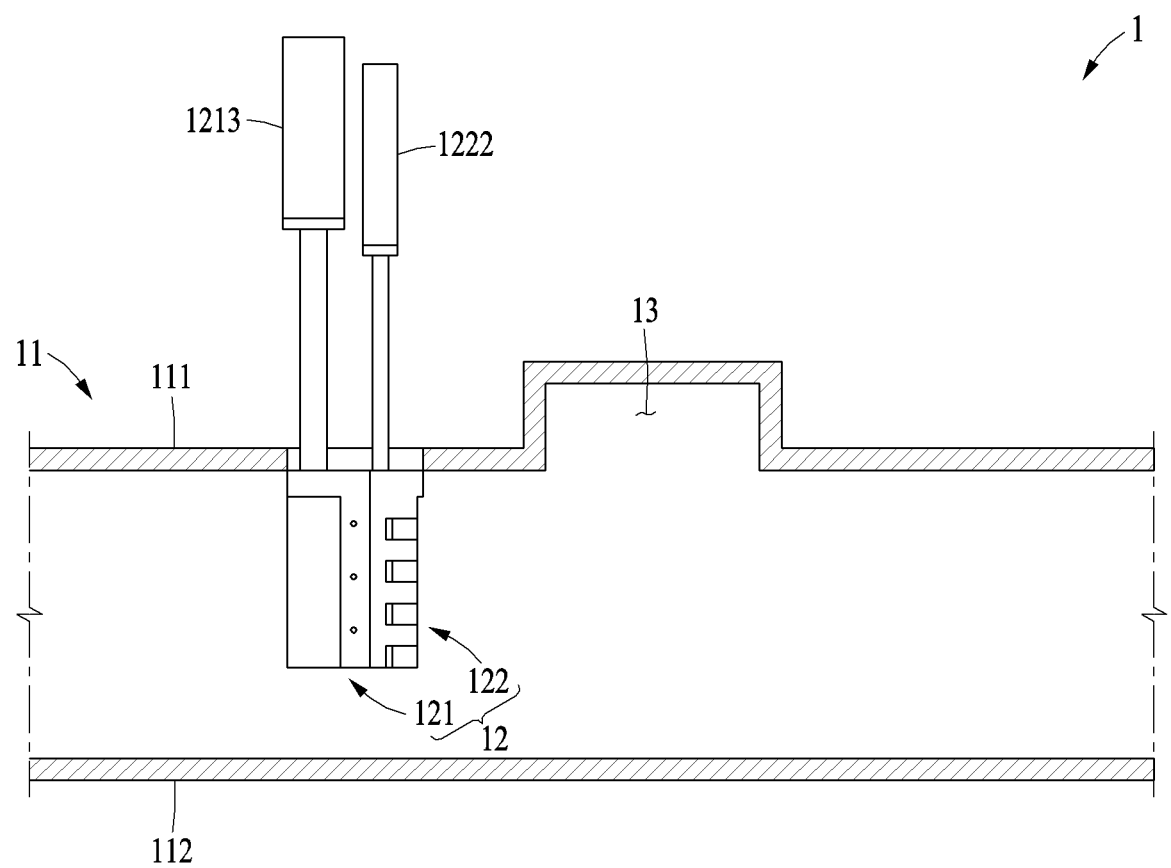
FIG. 2 is a diagram illustrating an internal structure of a combustor of a dual-mode ramjet engine according to an embodiment.
Figure 3:
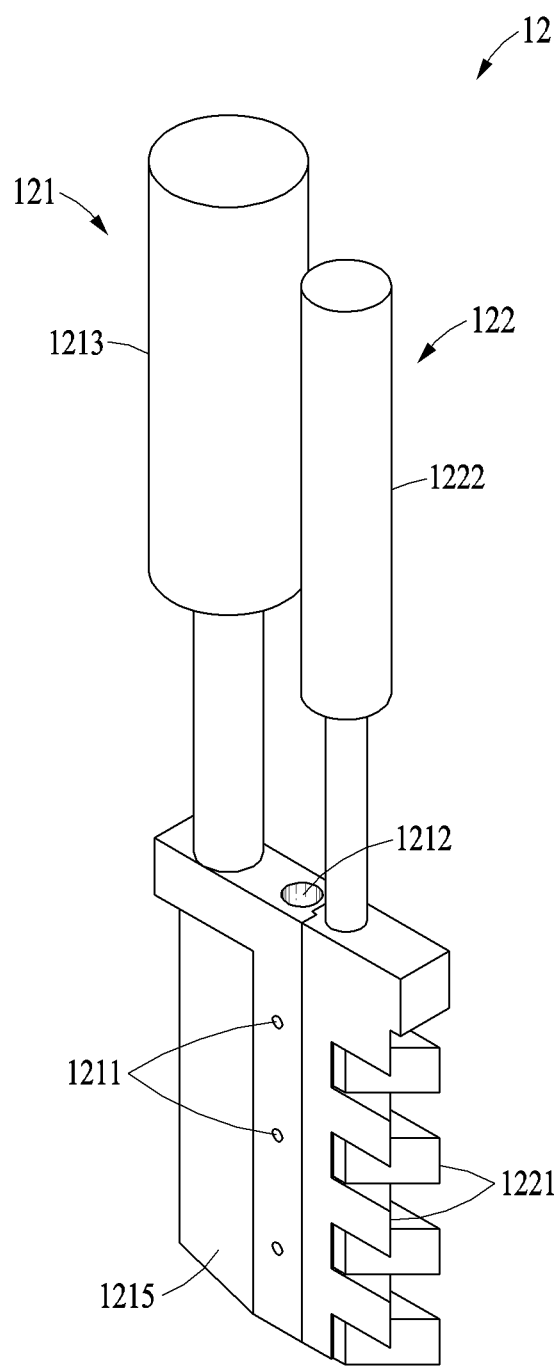
FIG. 3 is a perspective view of a variable fuel injection device according to an embodiment.
Figure 4:
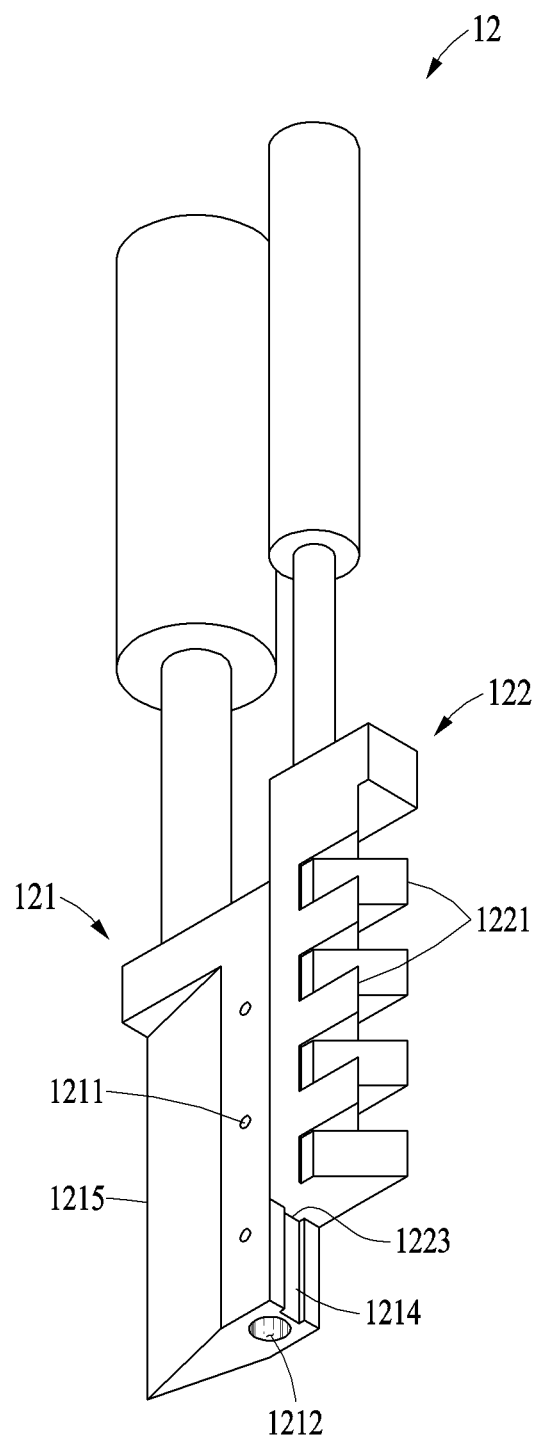
FIG. 4 is a perspective view of a variable fuel injection device viewed from the bottom according to an embodiment.
Figure 5:
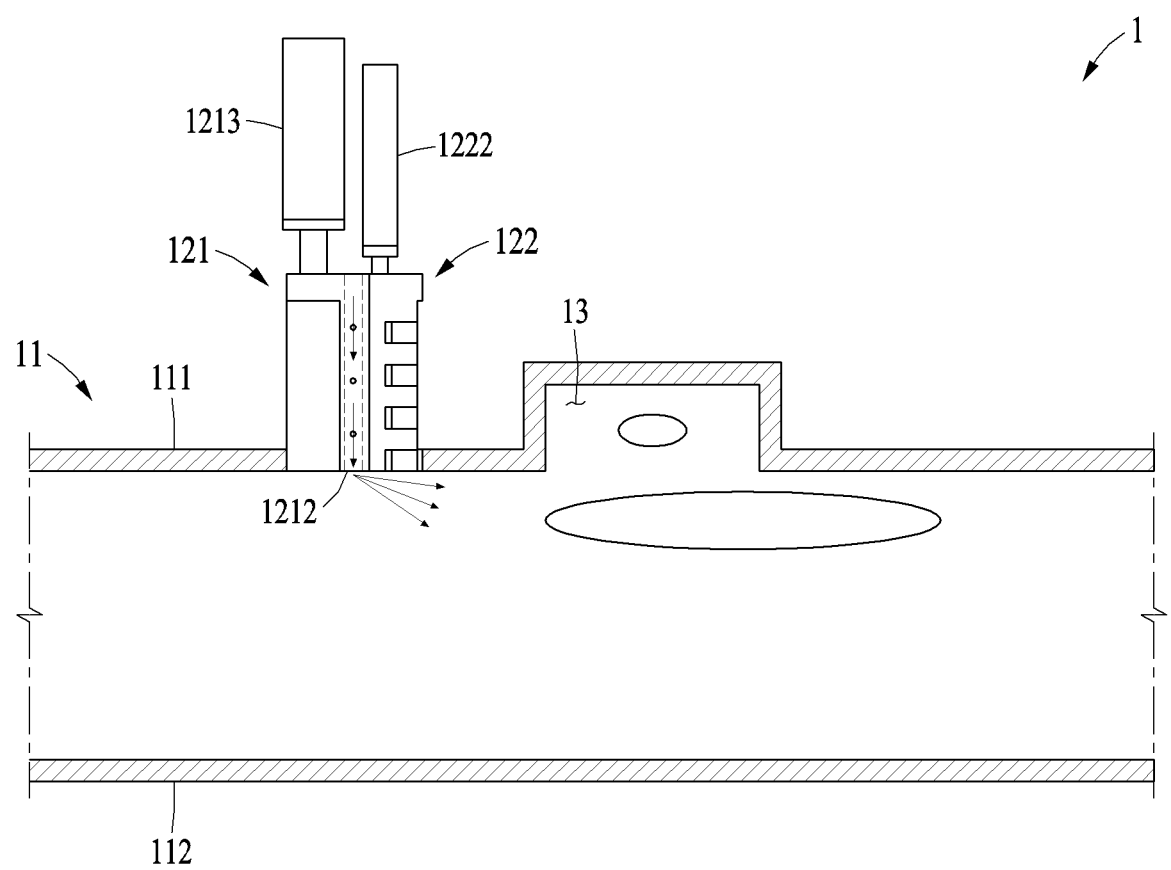
FIG. 5 is a diagram illustrating a configuration of injecting fuel into a combustor through a fuel injection passage in a state in which a variable fuel injection device is fully retracted according to an embodiment.
Figure 6:
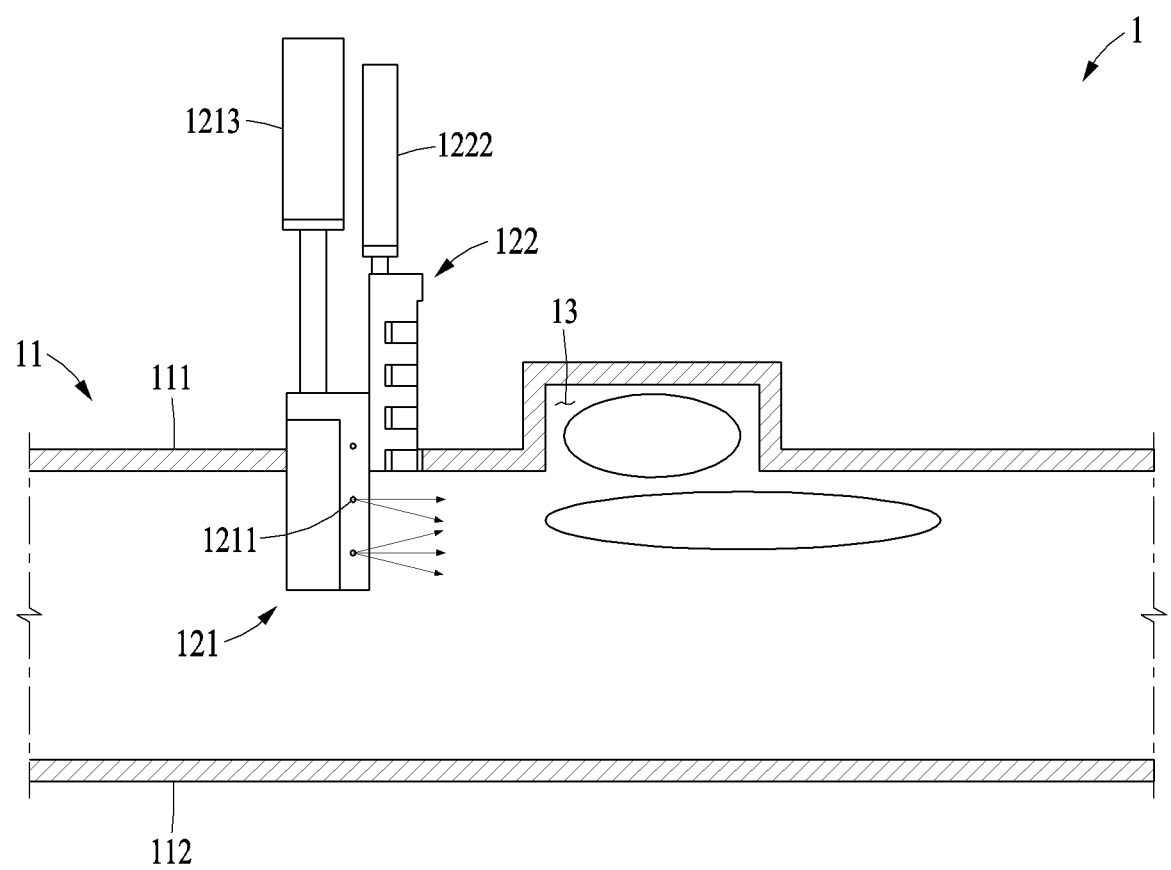
FIG. 6 is a diagram illustrating a configuration of injecting fuel into a combustor in a state in which a sliding injector of a variable fuel injection device is partially developed according to an embodiment.
Figure 7:
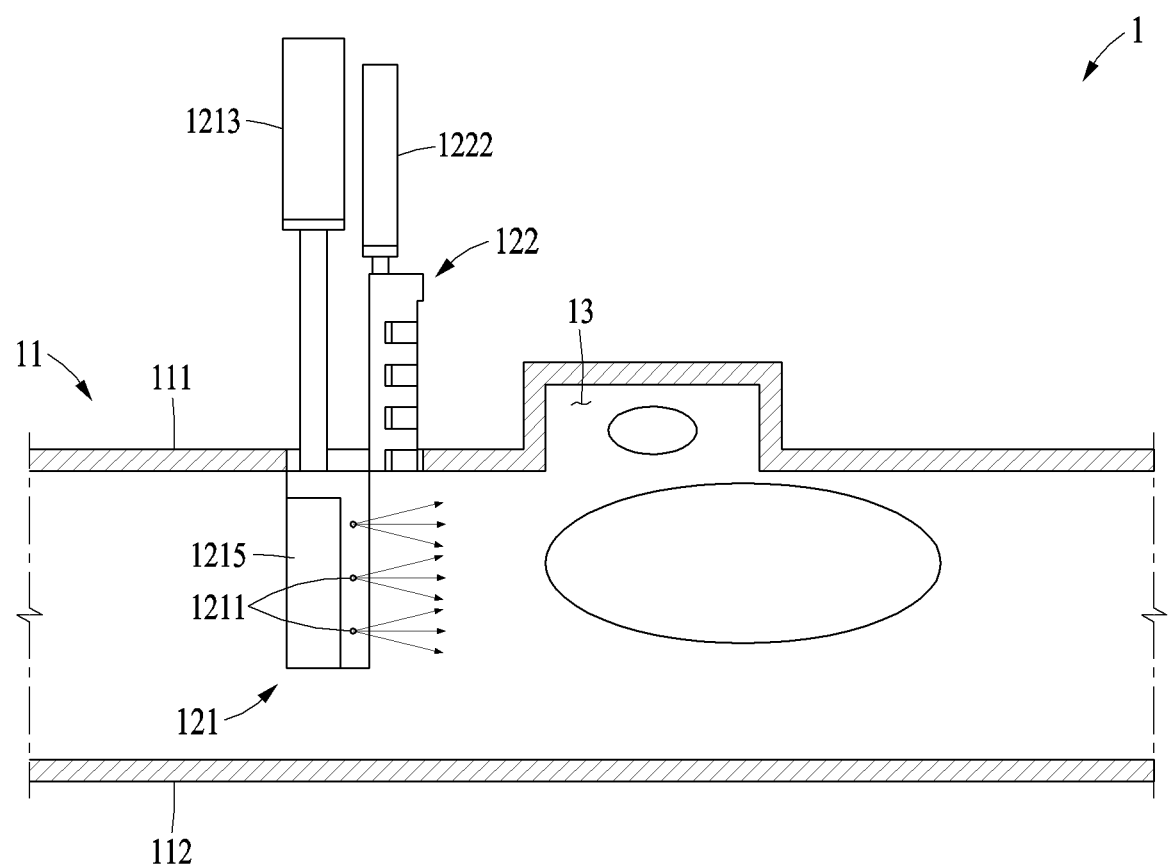
FIG. 7 is a diagram illustrating a configuration of injecting fuel through a fuel injection passage in a state in which a sliding injector of a variable fuel injection device is fully developed according to an embodiment.
Figure 8:
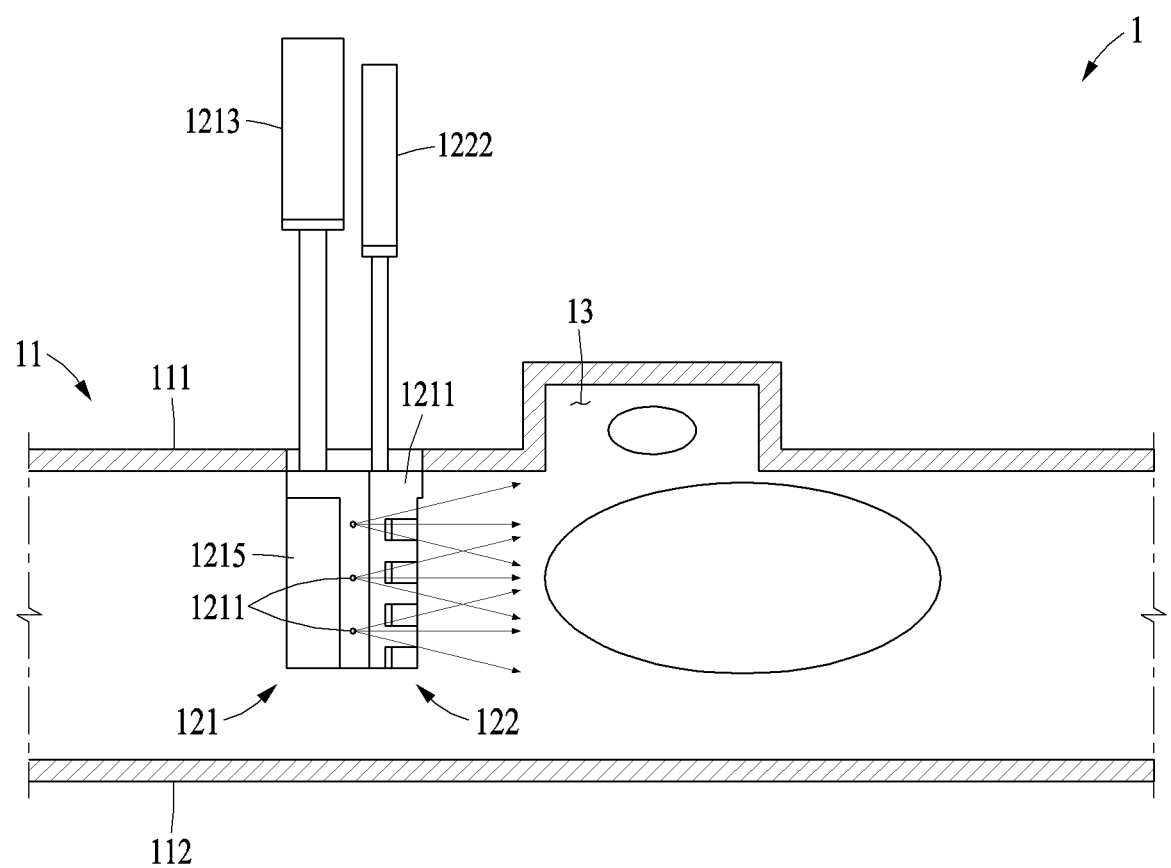
FIG. 8 is a diagram illustrating a configuration of injecting fuel through a fuel injection passage in a state in which a variable fuel injection device is fully developed according to an embodiment.

FIG. 1 is a block diagram illustrating a dual-mode ramjet engine including a variable fuel injection device according to an embodiment, FIG. 2 is a diagram illustrating an internal structure of a combustor of a dual-mode ramjet engine according to an embodiment, FIG. 3 is a perspective view of a variable fuel injection device according to an embodiment, FIG. 4 is a perspective view of a variable fuel injection device viewed from the bottom according to an embodiment, FIG. 5 is a diagram illustrating a configuration of injecting fuel into a combustor through a fuel injection passage in a state in which a variable fuel injection device is fully retracted according to an embodiment, FIG. 6 is a diagram illustrating a configuration of injecting fuel into a combustor in a state in which a sliding injector of a variable fuel injection device is partially developed according to an embodiment, FIG. 7 is a diagram illustrating a configuration of injecting fuel through a fuel injection passage in a state in which a sliding injector of a variable fuel injection device is fully developed according to an embodiment, and FIG. 8 is a diagram illustrating a configuration of injecting fuel through a fuel injection passage in a state in which a variable fuel injection device is fully developed according to an embodiment.

Referring to FIGS. 1 to 8, according to an embodiment, a dual-mode ramjet engine 1 may refer to an engine that generates a thrust force through injection and ignition of fuel using a supersonic air flow incoming through an inlet port at the front.

For example, the dual-mode ramjet engine 1 may operate in both a ramjet mode and a scramjet mode in a wide flight range encompassing from supersonic to hypersonic ranges.

For example, the dual-mode ramjet engine 1 may include a combustor 11, a variable fuel injection device 12, a cavity-type flame holder 13, and a controller 14.

The combustor 11 may have a passage through which air flows in from the front with respect to an air flow direction, and as fuel is injected from the inside to be mixed with air and combusted, may generate a thrust force.

For example, the combustor 11 may include an upper surface 111 and a lower surface 112 based on a height direction.

For example, the combustor 11 may have an angled wall surface as shown in FIGS. 5 to 8 but may alternatively be circular or have another shape.

The variable fuel injection device 12 may inject fuel into the inside of the combustor 11 and mix it with superspeed air flowing into the combustor 11.

For example, the variable fuel injection device 12 may include a sliding injector 121 and a sliding mixer 122.

The sliding injector 121 may be configured to inject fuel into the combustor 11, and may perform a sliding operation to be developed or retracted from the upper surface 111 of the combustor 11 along the height direction (e.g., a vertical direction or up/down direction as shown in the drawing) according to a desired operating condition of the dual-mode ramjet engine 1.

For example, the sliding injector 121 may include a fuel injection hole 1211 configured to inject supplied fuel therethrough, a fuel injection passage 1212 configured to receive fuel along the height direction and inject it into an opening on a lower side, a first sliding drive unit 1213 configured to drive the sliding injector 121 to perform the sliding operation, a first sliding guider 1214 that is coupled to the sliding mixer 122 present behind and guides a sliding movement in the height direction with respect to each other, and a front-end portion 1215 formed in a portion facing the flow of air flowing in from the front.

The fuel injection hole 1211 may be an opening or nozzle installed on both sides of the sliding injector 121 through which fuel is injected. For example, the fuel injection hole 1211 may be provided as a plurality of fuel injection holes 1211 spaced apart from each other along the height direction. The fuel injected through the fuel injection hole 1211 may be injected backward along a wall on the sides of the sliding injector 121 in the air flow direction.

For example, the specific dimensions (e.g., size, number, position, etc.) of the fuel injection hole 1211 may vary depending on a specific design and operating condition of the dual-mode ramjet engine 1.

For example, the fuel injection hole 1211 may be developed or retracted by a set distance from the wall to achieve desired fuel injection characteristics.

For example, the fuel injection hole 1211 may be moved such that the injected fuel has a height adjacent to a wall boundary layer of the combustor 11. For example, the fuel injection hole 1211 may be disposed near a wall of the upper surface 111 of the combustor 11 to increase an amount of fuel flowing into the cavity-type flame holder 13.

The fuel injection passage 1212 may be a fuel supply passage that passes through the inside of the sliding injector 121 along the height direction to be opened downward.

The fuel injection passage 1212 may be configured to inject fuel from the wall of the upper surface 111 of the combustor 11, when the sliding injector 121 is positioned in a retracted state toward an upper side of the upper surface 111 of the combustor 11.

The width of the fuel injection passage 1212 may be greater than the diameter of the fuel injection hole 1211, and when the sliding injector 121 and the sliding mixer 122 are completely retracted inward, the fuel injection passage 1212 may be designed such that fuel is injected from the wall of the upper surface 111 of the combustor 11 through the fuel injection passage 1212 as shown in FIG. 5.

This structure described above may allow the fuel injection passage 1212 to minimize an internal drag inside the combustor 11 and enable marginal fuel injection from the upper surface 111 of the combustor 11.

For another example, the fuel injection passage 1212 may have a slit-shaped groove structure that is concavely recessed on both sides where the fuel injection hole 1211 is installed and extends in the height direction. In this case, the fuel injection passage 1212 and the fuel injection hole 1211 may communicate with each other.

This structure described above may allow the fuel injected through the fuel injection hole 1211 when the sliding injector 121 is completely retracted to move downward along the fuel injection passage 1212 and be injected into the inside of the combustor 11 from the upper surface 111 of the combustor 11.

The first sliding drive unit 1213 may be installed outside the upper surface 111 of the combustor 11 and configured to drive the sliding injector 121 to perform the sliding operation along the height direction.

The first sliding drive unit 1213 may include an actuator, a motor, or other mechanical power elements configured to generate a force that drives the sliding injector 121 to perform the sliding operation.

The first sliding guider 1214 may be slidably coupled to the sliding mixer 122 disposed behind the sliding injector 121 and configured to guide a mutual sliding movement in the height direction. The first sliding guider 1214 may be installed at the rear of the sliding injector 121 and may be slidably coupled to a second sliding guider 1223 of the sliding mixer 122 disposed behind.

The front-end portion 1215 may be formed to protrude to have a wedge shape toward the front from which air flows in, as shown in FIGS. 3 and 4. For example, the front-end portion 1215 may have a structure whose lateral width in a left/right direction decreases while being developed forward.

This structure of the front-end portion 1215 may reduce the resistance to air flowing in from the front and, at the same time, allow high-speed air flowing into the front-end portion 1215 to flow along a wall of the front-end portion 1215, thereby guiding the air to flow along both sides where the fuel injection hole 1211 is disposed.

The sliding mixer 122 may be installed behind the sliding injector 121 and configured to generate a turbulent flow in the wake of the fuel injected through the fuel injection hole 1211, thereby promoting the fuel mixture inside the dual-mode ramjet engine 1.

The sliding mixer 122 may be installed behind the sliding injector 121 and configured to slidably move to be independently developed and retracted along the height direction.

For example, the sliding mixer 122 may include a dispersion protrusion 1221 protruding rearward, a second sliding drive unit 1222 configured to drive the sliding mixer 122 to perform a sliding operation, and a second sliding guider 1223 coupled to the sliding injector 121 present before and configured to guide a mutual sliding movement in the height direction.

The dispersion protrusion 1221 may be installed in a portion facing the rear and may be formed to protrude to have an inclination diverging from the flow direction toward the rear.

For example, the dispersion protrusion 1221 may be formed to protrude to have a shape inclined leftward or rightward as it is developed rearward.

For example, the dispersion protrusion 1221 may be provided as a plurality of dispersion protrusions arranged along the height direction, and in this case, the adjacent dispersion protrusions 1221 may form an inclination in opposite directions from each other.

For example, it should be noted that the shape and size of the dispersion protrusion 1221 may vary depending on factors such as an operating condition and a fuel characteristic of the dual-mode ramjet engine 1.

The dispersion protrusion 1221 may induce the fuel injected through the fuel injection hole 121, which flows rearward along the walls of the sliding injector 121 and the sliding mixer 122 disposed before and behind with respect to each other, and air to generate dispersion or turbulence in the wake of the sliding mixer 122, thereby promoting the mixture of fuel and air.

The second sliding drive unit 1222 may be installed outside the upper surface 111 of the combustor 11 and configured to drive the sliding mixer 122 to perform the sliding operation along the height direction.

The second sliding drive unit 1222 may include an actuator, a motor, or other mechanical power elements configured to generate a force that may drive the sliding mixer 122 to perform the sliding operation.

The second sliding guider 1223 may be slidably coupled to the sliding injector 121 positioned before the sliding mixer 122 and configured to guide a mutual sliding movement in the height direction with respect to each other. The second sliding guider 1223 may be installed in the front of the sliding mixer 122 and may be slidably coupled to the first sliding guider 1214 of the sliding injector 121 disposed before.

For example, the first sliding guider 1214 may be designed to have a shape and size complementary to those of the second sliding guider 1223 to ensure a firm and stable coupling.

For example, the first sliding guider 1214 and the second sliding guider 1223 may each have a shape of a concavo-convex groove or protrusion that engages with each other. For example, the coupling between the two may allow the sliding mixer 122 to slide along the height direction while the sliding mixer 122 is coupled to the rear of the sliding injector 121.

Although the configuration of the dual-mode ramjet engine 1 in which a single variable fuel injection device 12 is provided inside the combustor 11 is described with reference to FIGS. 1 to 8, another configuration in which a plurality of variable fuel injection devices 12 are provided inside the combustor 11 may also be possible, and in this case, the arrangement and arrangement structure of the plurality of variable fuel injection devices 12 may be set in various ways according to an operating environment or condition of the dual-mode ramjet engine 1. Alternatively, as needed, one or more controllers 14 may control the driving of the plurality of variable fuel injection devices 12 individually.

The cavity-type flame holder 13 may be formed on the top of the combustor 11, i.e., the wall of the upper surface 111 of the combustor 11, to form a cavity space recessed upward from the upper surface 111 of the combustor 11. The cavity-type flame holder 13 may maintain a flame inside the combustor 11 by generating a recirculating flow inside the cavity space such that the mixture of fuel and air continues to be ignited and combusted.

The controller 14 may be configured to control the operations of the variable fuel injection device 12 and other engine components. For example, the controller 14 may include various sensors and control equipment to optimize the performance of the dual-mode ramjet engine 1 under various operating conditions.

For example, the controller 14 may adjust the operation of the variable fuel injection device 12 according to operating parameters of the dual-mode ramjet engine 1.

For example, the controller 14 may receive combustor environment information measured from various sensors installed in the engine 1, such as, for example, a temperature sensor, a pressure sensor, a flow rate sensor, or the like.

For example, the controller 14 may control the fuel injection and mixing conditions of the combustor 11 by individually controlling the sliding injector 121 and the sliding mixer 122.

For example, the controller 14 may individually adjust the position of the sliding injector 121 or the sliding mixer 122 based on the Mach number of flight or other operating parameters of the dual-mode ramjet engine 1.

For example, the controller 14 may control the operation of the first sliding drive unit 1213 to develop or retract the sliding injector 121 along the height direction, and adjust the position of the fuel injection hole 1211 accordingly, thereby adjusting an amount or distribution of fuel to be injected toward the cavity-type flame holder 13 or the combustor 11.

For example, when the sliding injector 121 is fully developed by the controller 14 as shown in FIGS. 7 and 8, the controller 14 may control to inject fuel through the fuel injection hole 1211 to inject the fuel directly into an internal space of the combustor 11, thereby increasing a penetration distance of the fuel and increasing a thrust force.

For example, when the sliding injector 121 is only partially developed as shown in FIG. 6, that is, when at least one fuel injection hole 1211 among the plurality of fuel injection holes 1211 is at a height adjacent to the upper surface 111 of the combustor 11 and a remaining fuel injection hole 1211 among the plurality of fuel injection holes 1211 on a lower side is exposed in the internal space of the upper surface 111 of the combustor 11, an amount of fuel to be introduced into the cavity-type flame holder 13 may increase as a portion of injected fuel moves along the wall boundary layer of the upper surface 111 of the combustor 11. In this case, as the fuel moving along the wall boundary layer is sufficiently heated and mixed with air to flow into the cavity-type flame holder 13, it may be effective in terms of the ignition and flame maintenance (or flame stabilization) conditions of the dual-mode ramjet engine 1.

For example, when the sliding injector 121 is fully retracted as shown in FIG. 5, the controller 14 may inject fuel through the fuel injection passage 1212. In this case, the fuel may be injected at a position of the wall of the upper surface 111 of the combustor 11 through the fuel injection passage 1212 and, at the same time, the internal resistance may be minimized because there is no portion of the sliding injector 121 developed inside the upper surface 111 of the combustor 11.

This structure described above may increase a flow rate inside the combustor 11 when the speed of the dual-mode ramjet engine 1 reaches a hypersonic speed and may retract the sliding injector 121 or the sliding mixer 122 to reduce an internal drag of the combustor 11 and increase a thrust force more effectively.

The controller 14 may change an amount of fuel injected from the fuel injection hole 1211 as needed by adjusting the position of the sliding injector 121.

For example, the controller 14 may control the operation of the second sliding drive unit 1222 to adjust a fuel distribution in the combustor 11 to improve the mixture of fuel and air.

For example, when the controller 14 controls the sliding mixer 122 to be developed such that the sliding mixer 122 overlaps behind the sliding injector 121 as shown in FIG. 8, the fuel injected through the fuel injection hole 1211 may be guided to the dispersion protrusion 1221 present behind, along the walls of the sliding injector 121 and the sliding mixer 122, and a turbulent flow may thereby be generated in the wake of the dispersion protrusion 1221. In this case, the turbulent flow or turbulence may improve the mixture of fuel and air and simultaneously promote a wider fuel distribution.

In general, a high-speed flow environment may be formed inside the combustor 11, and an unnecessary internal drag may be generated by the sliding mixer 122. However, when the combustion efficiency increases by the improved fuel mixture, it may be possible to obtain an additional thrust force even though the increased internal drag is offset.

The embodiments described herein may be implemented using hardware components, software components and/or combinations thereof. A processing device may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as, parallel processors.

The software may include a computer program, a piece of code, an instruction, or some combination thereof, to independently or collectively instruct or configure the processing device to operate as desired. The software and/or data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter. The above-described hardware devices may be configured to act as one or more software modules in order to perform the operations of the above-described examples, or vice versa.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, in addition to the above disclosure, the scope of the disclosure may also be defined by the claims and their equivalents, and all variations within the scope of the claims and their equivalents are to be construed as being included in the disclosure.

What is claimed is:

1. A dual-mode ramjet engine, comprising:
   a combustor through which air flowing in from the front passes;
   a sliding injector configured to perform a sliding operation from an upper surface of the combustor along a height direction perpendicular to an air flow direction; and
   a cavity-type flame holder formed behind the sliding injector on the upper surface of the combustor and having a cavity that is concavely recessed.

2. The dual-mode ramjet engine of claim 1, wherein the sliding injector comprises:
   a plurality of fuel injection holes formed on both sides and configured to inject fuel;
   a fuel injection passage passing through the inside along the height direction to be opened downward, and configured to inject fuel; and
   a first sliding drive unit configured to drive the sliding injector to perform the sliding operation.

3. The dual-mode ramjet engine of claim 2, wherein the plurality of fuel injection holes are installed to be spaced apart from each other along the height direction.

4. The dual-mode ramjet engine of claim 3, further comprising:

a controller configured to control the sliding operation of the sliding injector and the injection of fuel, wherein the controller is configured to adjust a position of fuel injected through the plurality of fuel injection holes through the sliding operation of the sliding injector to adjust a distribution of fuel injected into each of the combustor and the cavity-type flame holder.

5. The dual-mode ramjet engine of claim 4, wherein the sliding injector further comprises:
a front-end portion formed in a portion facing the flow of air flowing in from the front and protruding to have a wedge shape whose lateral width in a left/right direction decreases toward the front.

6. The dual-mode ramjet engine of claim 4, wherein the controller is configured to:
by partially developing the sliding injector into the combustor, move at least one fuel injection hole among the plurality of fuel injection holes to have a height adjacent to the upper surface of the combustor, and move a remaining fuel injection hole on a lower side to be exposed to the inside of the combustor.

7. The dual-mode ramjet engine of claim 4, wherein the controller is configured to:
control the sliding injector to slide inward on the upper surface of the combustor to be retracted, and inject fuel through the fuel injection passage such that the fuel is injected from a position on the upper surface of the combustor.

8. The dual-mode ramjet engine of claim 4, further comprising:
a sliding mixer configured to perform a sliding operation from the upper surface of the combustor along the height direction, behind the sliding injector,
wherein the controller is configured to:
slidably move the sliding mixer such that the sliding mixer overlaps behind the sliding injector based on the air flow direction, and induce a turbulent flow to be formed behind the sliding mixer.

9. The dual-mode ramjet engine of claim 8, wherein the sliding mixer comprises:
a dispersion protrusion formed to protrude to have an inclination diverging from the flow direction toward the rear; and
a second sliding drive unit configured to drive the sliding mixer to perform the sliding operation.

10. The dual-mode ramjet engine of claim 9, wherein the dispersion protrusion is provided as a plurality of dispersion protrusions spaced apart from each other along the height direction,
wherein the plurality of dispersion protrusions has a shape inclined leftward or rightward as it is developed toward the rear.

11. The dual-mode ramjet engine of claim 9, wherein the sliding injector further comprises:
a first sliding guider installed on a portion facing the rear and coupled to the sliding mixer to be mutually slidably movable with respect to the sliding mixer at the rear,
wherein the sliding mixer further comprises:
a second sliding guider installed on a portion facing the front and coupled to the first sliding guider of the sliding injector to be mutually slidably movable with respect to the first sliding guider at the front.

12. A flying vehicle comprising:
a ramjet engine including:
a combustor through which air flowing in from the front passes;
a sliding injector configured to perform a sliding operation from an upper surface of the combustor along a height direction perpendicular to an air flow direction; and
a cavity-type flame holder formed behind the sliding injector on the upper surface of the combustor and having a cavity that is concavely recessed.

13. The flying vehicle of claim 12, wherein the sliding injector comprises:
a plurality of fuel injection holes formed on both sides and configured to inject fuel;
a fuel injection passage passing through the inside along the height direction to be opened downward, and configured to inject fuel; and
a first sliding drive unit configured to drive the sliding injector to perform the sliding operation.

14. The flying vehicle of claim 13, wherein the plurality of fuel injection holes are installed to be spaced apart from each other along the height direction.

15. The flying vehicle of claim 14, the ramjet further comprising:
a controller configured to control the sliding operation of the sliding injector and the injection of fuel,
wherein the controller is configured to adjust a position of fuel injected through the plurality of fuel injection holes through the sliding operation of the sliding injector to adjust a distribution of fuel injected into each of the combustor and the cavity-type flame holder.

16. The flying vehicle of claim 15, wherein the sliding injector further comprises:
a front-end portion formed in a portion facing the flow of air flowing in from the front and protruding to have a wedge shape whose lateral width in a left/right direction decreases toward the front.

17. The flying vehicle of claim 15, wherein the controller is configured to:
by partially developing the sliding injector into the combustor, move at least one fuel injection hole among the plurality of fuel injection holes to have a height adjacent to the upper surface of the combustor, and move a remaining fuel injection hole on a lower side to be exposed to the inside of the combustor.

18. The flying vehicle of claim 15, wherein the controller is configured to:
control the sliding injector to slide inward on the upper surface of the combustor to be retracted, and inject fuel through the fuel injection passage such that the fuel is injected from a position on the upper surface of the combustor.

19. The flying vehicle of claim 15, the ramjet further comprising:
a sliding mixer configured to perform a sliding operation from the upper surface of the combustor along the height direction, behind the sliding injector,
wherein the controller is configured to:
slidably move the sliding mixer such that the sliding mixer overlaps behind the sliding injector based on the air flow direction, and induce a turbulent flow to be formed behind the sliding mixer.

20. A method of operating a dual-mode ramjet, the method comprising:
causing air from a front of the ramjet to flow through a combustor, the ramjet including a cavity-type flame holder arranged behind a sliding injector on an upper surface of the combustor and having a cavity that is concavely recessed; and performing a sliding operation wherein the sliding injector slides from an upper surface of the combustor along a height direction perpendicular to an air flow direction, wherein performing the sliding operation is controlled by a controller configured adjust a position of fuel injected through a plurality of fuel injection holes through the sliding operation of the sliding injector to adjust a distribution of fuel injected into each of the combustor and the cavity-type flame holder.

* * * * *